(12) United States Patent
Dutov et al.

(10) Patent No.: US 6,442,187 B1
(45) Date of Patent: Aug. 27, 2002

(54) LASER DEVICE

(75) Inventors: Alexander Ivanovich Dutov, St. Petersburg; Alexey Alexeevich Kuleshov, Petrodvorets; Nikolay Alexeevich Novoselov; Alexander Alexandrovich Sokolov, both of St. Petersburg, all of (RU)

(73) Assignees: Gosudarstvennoye Predpriyatie Nauchnoissledovatelsky Institut Lazernoy Fiziki, St. Petersburg (RU); Amada Company, Limited, Kanagawa-ken (JP)

( * ) Notice: Subject to any disclaimer, the term of this patent is extended or adjusted under 35 U.S.C. 154(b) by 0 days.

(21) Appl. No.: 09/674,515

(22) PCT Filed: Jan. 31, 2000

(86) PCT No.: PCT/RU00/00026
§ 371 (c)(1),
(2), (4) Date: Feb. 16, 2001

(87) PCT Pub. No.: WO00/57521
PCT Pub. Date: Sep. 28, 2000

(30) Foreign Application Priority Data

Mar. 19, 1999 (RU) .......................................... 99105608

(51) Int. Cl.⁷ .............................. H01S 3/04; H01S 3/03; H01S 3/08
(52) U.S. Cl. ............................ 372/101; 372/61; 372/34
(58) Field of Search .......................... 372/101, 99, 98, 372/103, 69, 81, 83, 61, 62, 64, 95, 55, 34

(56) References Cited

U.S. PATENT DOCUMENTS

| | | | |
|---|---|---|---|
| 4,719,639 A | 1/1988 | Tulip | 372/66 |
| 5,123,028 A | 6/1992 | Hobart et al. | 372/95 |
| 5,353,297 A | 10/1994 | Koop et al. | 372/64 |
| 5,661,746 A | 8/1997 | Sukhman et al. | 372/83 |
| 5,684,820 A | 11/1997 | Jenkins et al. | 372/64 |

FOREIGN PATENT DOCUMENTS

| | | | |
|---|---|---|---|
| EP | 0275023 | 7/1988 | H10S/3/03 |
| GB | 2276031 | 9/1994 | H01S/3/05 |
| WO | 95/02909 | 1/1995 | H01S/3/03 |

*Primary Examiner*—Quyen Leung
(74) *Attorney, Agent, or Firm*—Greenblum & Bernstein, P.L.C.

(57) ABSTRACT

The present invention relates to laser devices with increased cooling capability by means of largely extended cooling surfaces contacting the laser active medium. According to the present invention there is provided a laser device comprising a large active volume in conjunction with a compact structure of the device and outputting single mode radiation. The laser device according to the present invention comprises the following features. A laser active medium, an optical resonator system defining an optical axis, exciting means for exciting said laser active medium and enabling a stimulated emission of radiation of said laser active medium, and cooling means, having first and second cooling elements arranged in spaced opposing relationship with surfaces facing each other, wherein said laser active medium is provided between said cooling elements along said optical axis. In order to increase the output power and to obtain single mode radiation an optical element is provided, arranged within the optical path formed by said optical resonator system and having a refractive power in a first plane, along said optical axis and perpendicular to said surfaces, differing from a refractive power in a second plane, along the optical axis and perpendicular to said first plane, wherein a contact of a laser beam deflected in said first plane with said surfaces of said first and second cooling elements is avoided.

21 Claims, 10 Drawing Sheets

LASER DEVICE

BACKGROUND OF THE INVENTION

The present invention relates to a laser device comprising a laser active medium, an optical resonator system defining an optical axis, exciting means for exciting said laser active medium and enabling a stimulated emission of radiation of said laser active medium, and cooling means having first and second cooling elements arranged in spaced opposing relationship with surfaces facing each other, wherein said laser active medium is provided between said cooling elements along said optical axis.

Laser devices as indicated above are generally known in the art. Basically, all kinds of laser devices have to deal with the problem of heat dissipation. For example, in a solid state rod laser device the surface of the rod which is subjected to excitation by a pumping light source such as a Xe lamp, is cooled and thus, a temperature gradient dependent on the cooling power and efficiency of the cooling means is generated. Thermal effects inside the rod strongly influence the optical properties of the laser active material such as the refractive index varying in dependence of the temperature distribution and birefringence, as well as of the further optical elements, namely the spherical resonator mirrors. It is difficult and costly to design a high quality laser system which is free of thermal degradation when the amount of heat generated during laser operation increases due to a desired increase of output power.

Consequently, laser devices were designed to improve both of the following aspects:

(i) increasing heat dissipation in order to achieve higher output power per unit volume of active laser material, and (ii) minimising the influence of the temperature gradients on the optical properties of the laser device.

In the field of gas lasers using RF-excitation so called slab lasers or zig-zag lasers were developed. These lasers have opposing RF electrodes formed of rectangular plates having a reflective surface. These electrodes are arranged such that therebetween a volume is formed with the resulting gap being filled with a laser active gas. The distance between these electrodes is typically about 2 to 4 mm and may be increased up to 1 cm if an additional gas flow is provided, while the width of the gap in the direction perpendicular to the distance is in the order of several cm. The electrodes are cooled and thus, the heat is dissipated from the laser gas by conduction cooling with the surfaces of the electrodes. As a result a large cooling area and thus a large cooling power is established.

Simultaneously, this structure provides a temperature gradient which is substantially directed merely perpendicular to the surfaces of the electrodes. except for distortions at the lateral ends of the plates. This structure tends to cancel the effect of temperature gradients since the laser beam zigzags in the plane of temperature variation. However, the relatively large distance of the plates in the cm range results in a wide range of reflecting angles in this plane. Therefore, the resulting made of the radiation is no longer determined by the spherical resonator mirrors to be single mode but consequently the radiation is a multi mode one. However, many applications of laser devices require a fine focusing of the laser beam to achieve a high power density and thus, a multi mode beam is not desired.

Furthermore, so called "waveguide" laser devices are known in the art wherein the radiation field in both of the transverse directions is confined by highly polished and highly reflective side walls. The radiation mode is completely determined by the waveguide cavity, whereas the resonator is merely composed of plane mirrors. In order to obtain single mode radiation from a waveguide laser the dimensions of the waveguide cavity are restricted to merely a few mm (2–4 mm). Waveguide lasers have excellent thermal properties, but the output power is low due to the small active volume.

U.S. Pat. No. 5,123,028 disposes a $CO_2$ stab laser including a waveguide arrangement formed by a pair of spaced apart planar electrodes having opposed light reflecting surfaces. The confinement of the radiation in the plane parallel to the electrode surfaces is attained by a negative branch unstable resonator.

WO 95/2909 describes a $CO_2$ slab waveguide laser wherein the light propagation path in plane parallel to the waveguide surfaces is folded by spherical mirrors.

GB 2276031 discloses a solid state laser device comprising a slab-shaped laser medium which has a pair of optically smooth surfaces. In the width dimension of the slab-shaped laser medium an unstable free space resonator is provided, whereas in the narrow spaced thickness direction of the slab medium confinement of the radiation is achieved by the optically smooth surfaces of the medium.

In U.S. Pat. No. 4,719,639 a laser device is disclosed, wherein by means of highly polished and highly reflective electrodes having a small distance of less than 5 mm in one transverse dimension waveguide conditions are created, while the other transverse dimension remains "open", i.e. the optical cavity in this direction is confined by spherical resonator mirrors. An arrangement as mentioned in the above disclosure succeeds in increasing the active volume in comparison to the waveguide laser, while on the other hand, a single mode radiation can be obtained. However, the distance of the electrodes is limited to typically 2–3 mm. In addition the electrodes require a high optical quality as well as high parallelism.

SUMMARY OF THE INVENTION

In view of the above mentioned problems and disadvantages of the prior art it is therefore an object of the present invention to provide a laser device of a compact structure having increased optical power and outputting finely focusable radiation.

The above mentioned object is solved by a laser device comprising a laser active medium, an optical resonator system defining an optical axis exciting means for exciting said laser active medium and enabling a stimulated emission of radiation of said laser active medium, and cooling means having first and second cooling elements arranged in spaced opposing relationship with surfaces facing each other, wherein said laser active medium is provided between said cooling elements along said optical axis and the laser device is characterised in that an optical element is provided, arranged within the optical path formed by said optical resonator system and having a refractive power in a first plane along the optical axis and perpendicular to said surfaces, differing from a refractive power in a second plane along the optical axis and perpendicular to said first plane, wherein said refractory power in said first plane of said optical element is adjusted so as to prevent interaction of the lowest order radiation mode with the surfaces of said first (61) and second (62) cooling elements.

The term "refractive power" refers to all kinds of optical elements, particularly to refractive, diffractive and reflective optical elements having the ability to collimate or disperse a light beam.

The term "along the optical axis" includes all arrangements of said planes parallel to the optical axis or the optical axis being within said planes.

"A plane along the optical axis perpendicular to said surfaces" represents a plurality of planes, which are parallel if the surfaces of the cooling elements are even and include a certain angular range if the surfaces are bent. The above definition may also include the case in which the "planes" are no longer even but comprise a certain curvature according to the spaced relationship of the cooling elements, for instance if the surfaces of the cooling elements are cylindrical with non-coinciding centres of curvature.

The definition of radiation mode used in this application is, with reference to the related art, to be understood in the following way:

In case of a free space propagation of the laser beam the TEM∞ mode constitutes the so-called fundamental or lowest order mode whereas the all other modes are indicated as higher order modes.

For a laser device having a square-shaped waveguide cavity the $EH_{11}$ mode is considered as the fundamental or lowest order mode and all other modes are treated as the higher order modes.

For a laser device having a slab-like waveguide cavity the radiation mode with a single maximum in its distribution of the transverse electric field in the non-free-space propagation direction is considered as the fundamental mode or the lowest order mode.

According to the present invention, in the laser device as defined above, the radiation generated within the active volume, i.e. within the laser active medium, is collimated or dispersed, respectively by an optical element in the plane which is perpendicular to surfaces of the first and second elements of the cooling means defining the location of the laser active medium, so as to confine, in combination with the arrangement of the spherical resonator mirrors, i.e. distances of the resonator mirrors, the curvatures thereof and the curvature of the optical element, the radiation field in this plane. The restriction of the radiation's angular range in the plane perpendicular to the surfaces of the cooling elements allows a larger separation of the cooling elements which were previously used for confining the laser radiation while maintaining an operation of the laser device in a single transverse mode.

The laser device according to the present invention unifies the advantages of small dimensions with increased output power. Reduced manufacturing costs result from the fact that the surfaces of the cooling elements need not be of high optical quality and the number of peripheral devices for cooling the laser active medium is reduced compared to a prior art laser device. In addition, the amount of required maintenance during the operation of a laser device according to present invention is low as the thermal stress of the various components of the laser device is reduced due to the increased cooling efficiency. Furthermore, misalignment of the cooling elements due to thermal expansion merely insignificantly affects the operation properties of the laser device since the distance of the cooling elements and their parallelism are not critical parameters. A further advantage is an increased lifetime resulting from the improved cooling efficiency.

In a further preferred embodiment of the present invention aperture means are disposed in the optical path. These aperture means can be realised, for example, by diaphragms which restrict the optically effective distance of the surfaces of the cooling elements. Preferably, the mutual arrangement of said optical element, optical resonator means and aperture means is optimised so as to minimise the radiation losses at said aperture means. The process of optimising the laser device in order to select a single mode operation in the plane in which the optical element controls the confinement of the radiation is considerably facilitated by these aperture means.

In a preferred embodiment of the present invention the optical element and the resonator system in combination form a stable resonator in the plane perpendicular to the surfaces of said cooling means. As a result, the laser beam never "touches" the surfaces of the cooling elements in this arrangement.

Advantageously, the optical axis of the laser device is divided into portions forming an angle in respect to each other, thereby reducing the overall longitudinal dimension of the laser device while simultaneously maintaining a large optically active volume.

Preferably, the optical element comprises a reflective surface in order to divide the optical axis in a first and at least one further portion, thereby reducing the number of required optical components in the laser device.

The optical element for collimating and dispersing, respectively, is preferably a cylindrical mirror which can be manufactured at relatively low cost.

Preferably, the curvatures of the mirrors of the optical resonator system are formed such that they can simultaneously serve as the optical element, thereby reducing the number of required optical components. A mirror of such design would be prererably bi-cylindrical.

In a further preferred embodiment of the present invention the distance of the surfaces varies along the optical axis correspondingly to a beam profile in this section. By this measure of adaption of the shape of the cooling elements to the beam diameter variation along the optical axis. Both the cooling efficiency and the optical power are optimised since the distance of the surfaces always remains at its minimally required value.

Preferably, the first and second elements of the cooling means are made of an electrically conductive material. This provides the possibility to use the elements as electrodes. Furthermore, a high electrical conductivity usually also implies a high thermal conductivity, which means a uniform temperature distribution over the surfaces of the elements and thus, generating a one-dimensional temperature gradient.

In a preferred embodiment of the present invention said exciting means is a radio frequency source including a power matching circuitry, and said radio frequency source is electrically connected to said first and second elements of said cooling means. In this manner, since the elements of the cooling means have a double function, the dimensions of the laser device can further be reduced.

The laser active medium is preferably a laser gas. In conjunction with the elements of the cooling means which are also serving as RF electrodes an effective cooling of the laser gas by means of conduction cooling is accomplished and thus, a powerful gas laser having a large laser active volume within the laser gas compared to the prior art gas lasers is created.

In a preferred embodiment of the present invention said gas comprises the components: $CO_2$, $N_2$, He, Xe. The usage of the additional component Xe results in an increasing output power of about 20–30% due to the modification of the velocity spectrum of the electrons exciting the molecule oscillations in $CO_2$ and $N_2$.

Preferably, the cooling elements comprise passage ways in order to allow a gas flow for increasing the cooling capacity and replacing the degraded $CO_2$ molecules.

Advantageously, said optical resonator system is a negative branch unstable resonator system. The negative branch unstable resonator is an unstable resonator system comprising a focus between the resonator mirrors. In this case, the optical element has to have a collimating effect in order to confine the radiation field. The sensitivity to misalignment of this type of resonator is much smaller than that of a positive branch unstable resonator or of a stable resonator. Thus, the influence of thermal expansion and mechanical stress resulting in misalignment during operation is less important compared to the prior art devices.

In the laser device of the present invention the surface distance of a single device can be selected as a value in the range from 2 mm to 15 mm. Even for a value of 2 mm the propagating laser light never touches the surfaces of the cooling elements. Moreover, by employing an additional slow-flow gas exchange across the cooling elements the output power of the laser device may be significantly increased (several times of the output power without a gas flow).

In a further preferred embodiment of the present invention the optical axis is divided into several portions, the several portions not being in a common plane. Various parts of a laser device containing an active volume may thus be arranged in a "3-dimensional" structure resulting in a high output power device with small overall dimensions.

In a further preferred embodiment of the present invention, the cooling elements are formed to have plane surfaces facing each other. This results in a simple geometry of the active volume of the laser device and hence, in an easy-to-build optical element since the planes in which the optical element collimates or disperses, respectively are parallel. Thus the optical element can be provided, for example, as a cylindrical mirror.

Further preferred embodiments follow from the dependent claims.

SHORT DESCRIPTION OF THE DRAWINGS

DETAILED DESCRIPTION OF THE PREFERRED EMBODIMENTS

Figure 1:
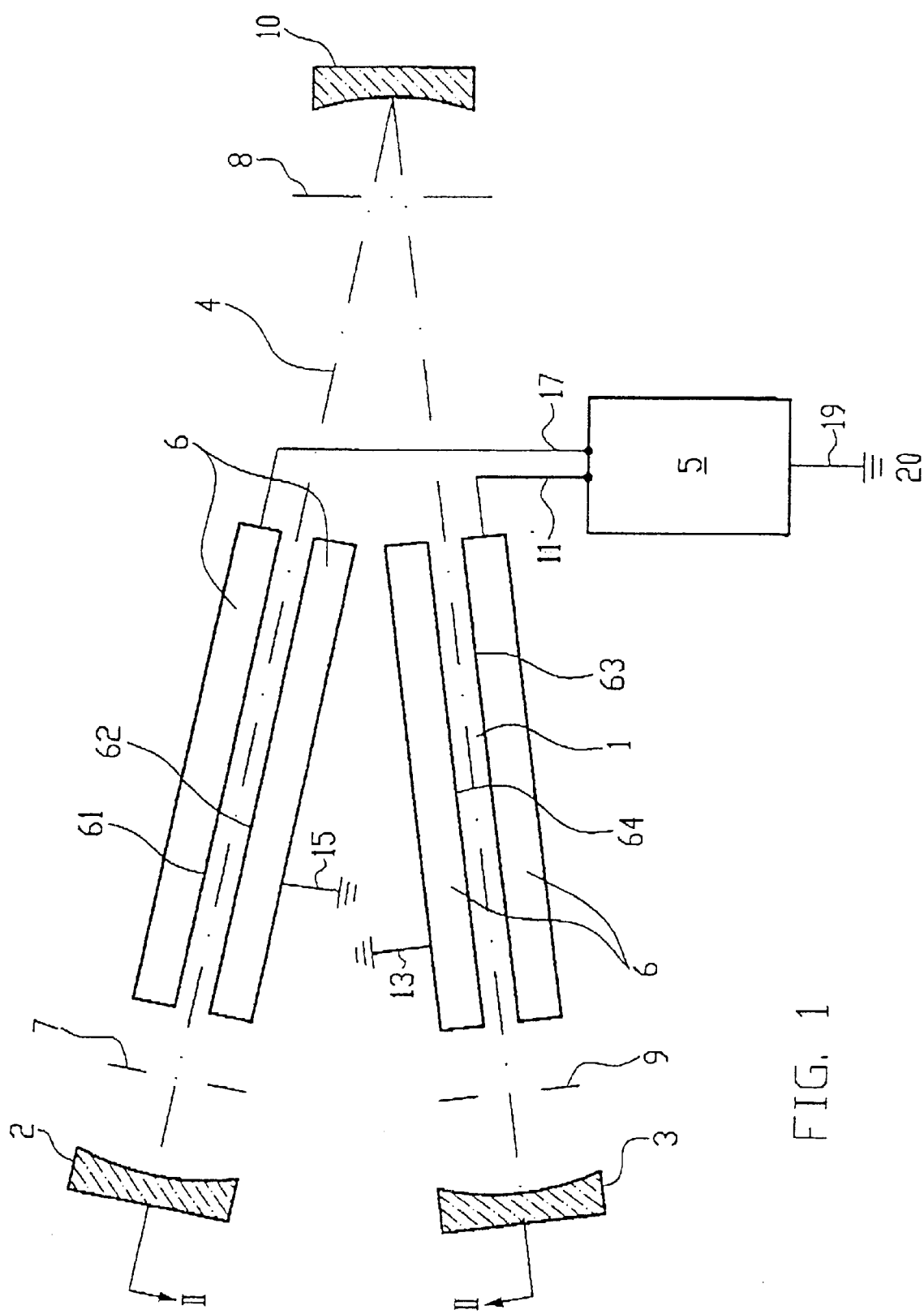
FIG. 1 shows a schematic cross-sectional view of a first embodiment of the present invention.
Figure 2:
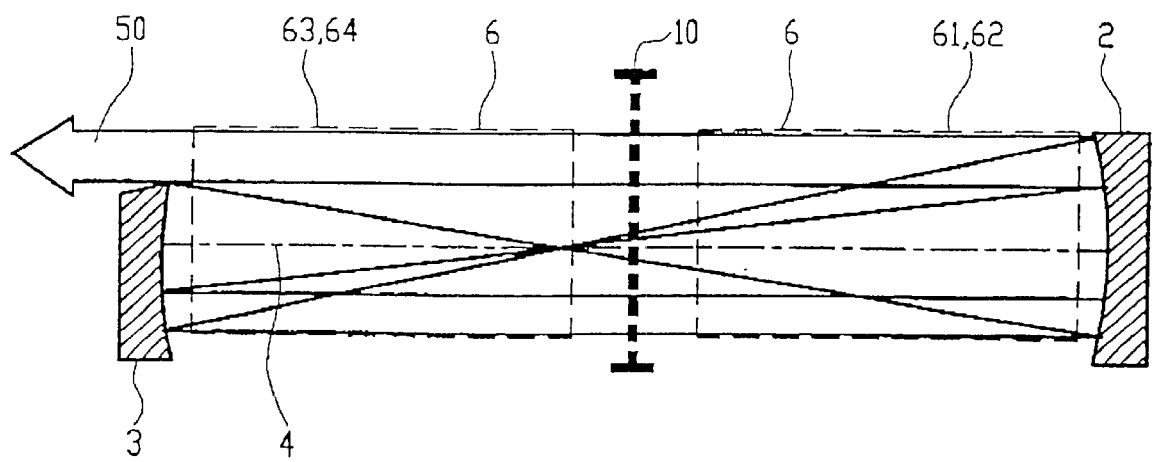
FIG. 2 shows a schematic cross-sectional view perpendicular to the view of FIG. 1 of the first embodiment taken along the line II—II in FIG. 1.

With reference to FIGS. 1 and 2, a preferred embodiment of the invention is described in detail.

The schematic cross-sectional view of FIG. 1 shows a first embodiment of the laser device according to the present invention which comprises cooling means 6 with cooling elements 61, 62, 63 and 64 made of an electrically and thermally conductive material. An optical resonator system comprises a spherical resonator mirror 2 and a spherical resonator mirror 3 both having a concave curvature. The resonator mirrors 2 and 3 form a negative branch unstable resonator system.

Between the cooling elements 61, 62, 63 and 64 a laser gas 1 is provided which may be composed of the components $N_2$, $CO_2$, He, Xe.

The system further comprises an optical element 10 provided as a cylindrical mirror wherein the cylinder axis of optical element 10 is perpendicular to the drawing plane. An optical axis 4 is defined by the optical resonator system and divided into two portions by optical element 10.

Further, aperture means comprising diaphragms 7, 8, and 9, respectively, are provided along the optical axis wherein diaphragm 7 is disposed between spherical mirror 2 and the ends of cooling elements 61 and 62, diaphragm 9 between spherical mirror 3 and the ends of cooling elements 63 and 64, and diaphragm 8 between optical element 10 and the other ends of cooling elements 61, 62, 63 and 64.

An exciting means 5 for exciting the laser gas to emit laser radiation is, according to this embodiment, a radio frequency source including a power matching circuitry. The RF-source is connected to the cooling means serving as electrodes by electrical connectors 11,13,15,17 and 19, and is further connected to a reference potential 20.

Each pair of cooling elements 61, 62 and cooling elements 63, 64, respectively form a volume which contains the laser gas 1. When exiting means 5 supplies an RF current via electrical connectors 11,13,15,17 and 19 to the respective pairs of cooling elements 61, 62 and 63, 64, laser gas 1 is excited and emits stimulated emission. The emitted radiation is confined in the plane perpendicular to the drawing plane of FIG. 1 by the resonator system which is a negative branch unstable resonator. The features of this type of resonator will be explained with reference to FIG. 2 in the following paragraph. In this plane optical element 10 does not affect the operation of the resonator system and merely divides the optical axis into two portions.

In the drawing plane of FIG. 1, the radiation field is confined by the resonator system, the aperture means and optical element 10. The aperture sizes of the diaphragms 7, 8 and 9 restrict the optically effective distance of the pair of cooling elements 61, 62 and 63, 64, respectively. Once the curvatures of the spherical mirrors 2 and 3 and the distance of the surfaces of the cooling elements 61, 62 and 63, 64, respectively, are given the distances of the spherical mirrors 2 and 3 from the respective ends of the corresponding cooling elements, the distance of the optical element 10 from the corresponding ends of the cooling elements, the curvature of optical element 10 and the aperture sizes of diaphragms 7, 8, 9 are selected so as to form a stable resonator, to minimise the radiation losses in the diaphragms, and to simultaneously provide a radiation of suitable low order mode leaving the resonator system at spherical mirror 3.

FIG. 2 is a schematic cross-sectional view of the first embodiment of the present invention in a plane perpendicular to the drawing plane of FIG. 1. For a better understanding, the two portions of the optical axis 4 of FIG. 1 are arranged in a straight line in the illustration of FIG. 2.

In FIG. 2, there is shown the optical resonator system comprising the spherical mirrors 2 and 3, wherein the upper part of spherical mirror 3 is cut out to provide an opening for the laser beam to leave the resonator system. A laser beam leaving the resonator system at spherical mirror 3 has the reference number 50.

In FIG. 2, the radiation emitted by the laser gas (not shown) is reflected several times between the spherical mirrors 2 and 3 and leaves the resonator system as laser beam 50 at spherical mirror 3. In the drawing plane of FIG. 2, optical element 10 does not affect the function of the resonator system. Mirrors 2 and 3 have concave curvatures and form a negative branch unstable resonator, that is the resonator comprises a focus between the spherical mirrors and the radiation already leaves the resonator system after few reflections. Since the optical path of the active volume between the spherical mirrors 2 and 3 in the direction of the distance of the cooling means is restricted by these cooling means, the laser beam has to be "re-bent" in this direction and thus, optical element 10 has to be of the collimating type. The unstable resonator is relatively insensitive in regard to misalignment. This type of resonator has further the advantage of providing a single mode output while filling the laser volume to a high degree.

A further preferred embodiment of the present invention is now described with reference to FIG. 3, which is a schematic cross-sectional view of the laser device according to the present invention, in the plane of beam propagation.

The laser device of the second embodiment comprises an optical resonator system of the negative branch unstable type comprising spherical mirrors 302 and 303. An optical axis 304 is divided into several portions by optical elements 310, 320, 330, 340 and 350 which may be provided as cylindrical mirrors.

Cooling means 306 comprising two cooling elements 361 and 362 are arranged so that their inner surfaces enclose the laser active medium and the beam propagation path is folded back and forth by the optical elements 310, 320, 330, 340, 350.

Further, aperture means are provided comprising diaphragms 370 to 376, wherein diaphragms 370, 372, 374, 376 are arranged between one side edge of the pair of cooling elements 361, 362 and spherical resonator mirror 302, optical element 320, optical element 340 and spherical resonator mirror 303, respectively, and diaphragms 371, 373, 375 are provided between the other side edge of the pair of cooling elements 361, 362 and optical elements 310, 330, 350, respectively. The diaphragms 370 to 376 restrict the optically effective distance of the cooling elements 361, 362. This distance is perpendicular to the drawing plane of FIG. 3 and consequently, the diaphragms appear as solid lines in FIG. 3.

Figure 3:
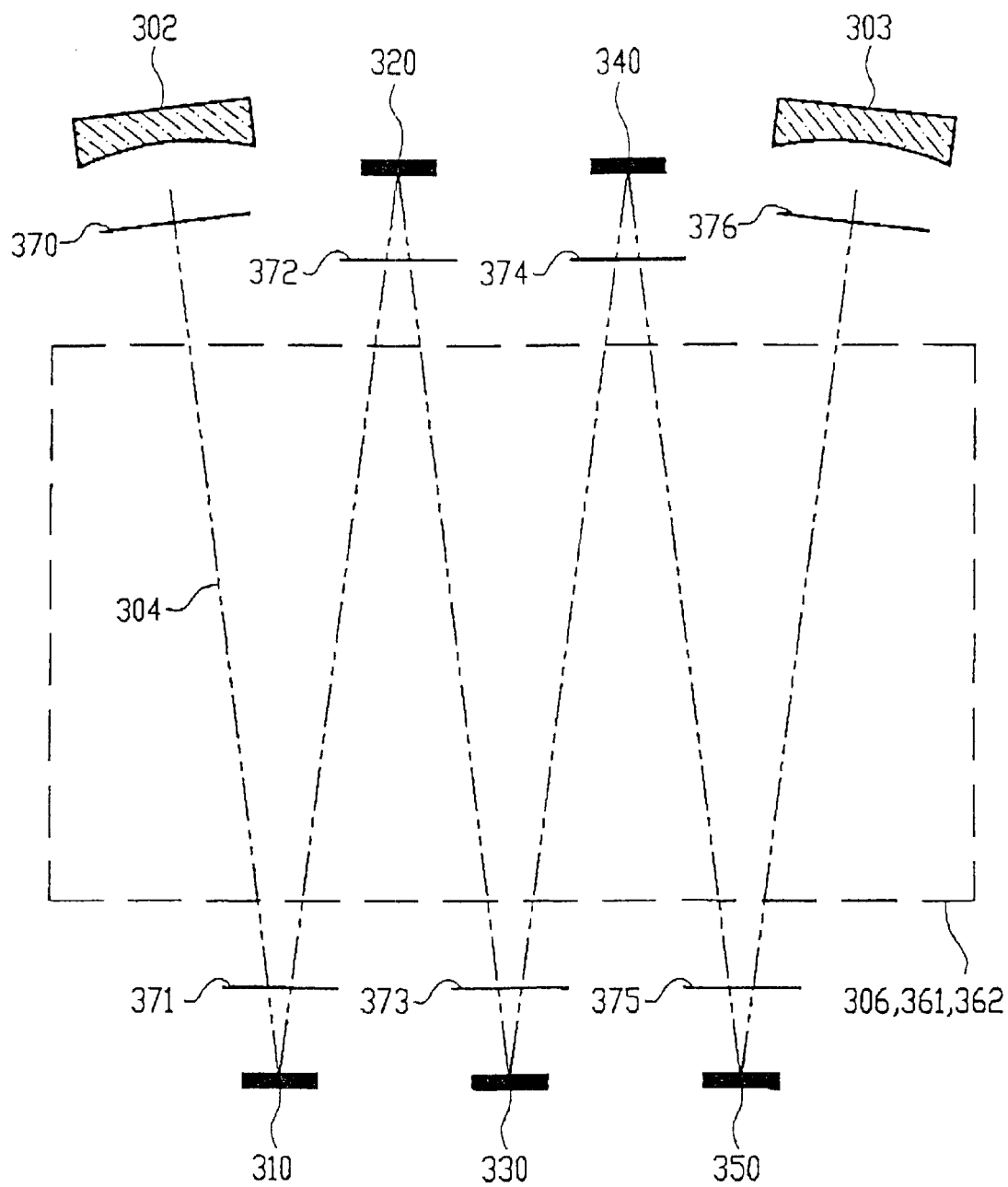
FIG. 3 shows a schematic cross-sectional view of a second embodiment of the laser device according to the present invention.

When a laser active medium (not shown) between the cooling elements 361 and 362 is excited radiation emitted by the excited laser active medium is confined in the transverse direction in the drawing plane of FIG. 3 by the spherical mirrors 302 and 303, respectively. In this plane the optical elements divide the optical axis into several portions, but do not affect the optical confining operation of the resonator system. In the direction perpendicular to the drawing plane, the confinement of the radiation is accomplished by spherical mirrors 302, 303, diaphragms 370 to 375 and the optical elements 310 to 350 which may be cylindrical mirrors. The distances of the optical elements 310 to 350 from the cooling elements 361, 362, the aperture sizes of diaphragms 370 to 375 for restricting an optically effective distance of the cooling elements' surfaces facing each other, and the curvatures of the optical elements 310 to 350 are optimised to form a stable resonator in the drawing plane, to minimise the radiation losses at the diaphragms 370 to 375 and to select a suitably low order mode of radiation. According to this embodiment a very compact laser device can be realised due to the fact that the optical path is divided into several portions and the longitudinal dimension of the device is accordingly reduced. Furthermore, the temperature distribution in the planes where the laser active medium contacts the cooling elements can be kept rather constant resulting in higher reliability during operation with high output power.

Figure 4:
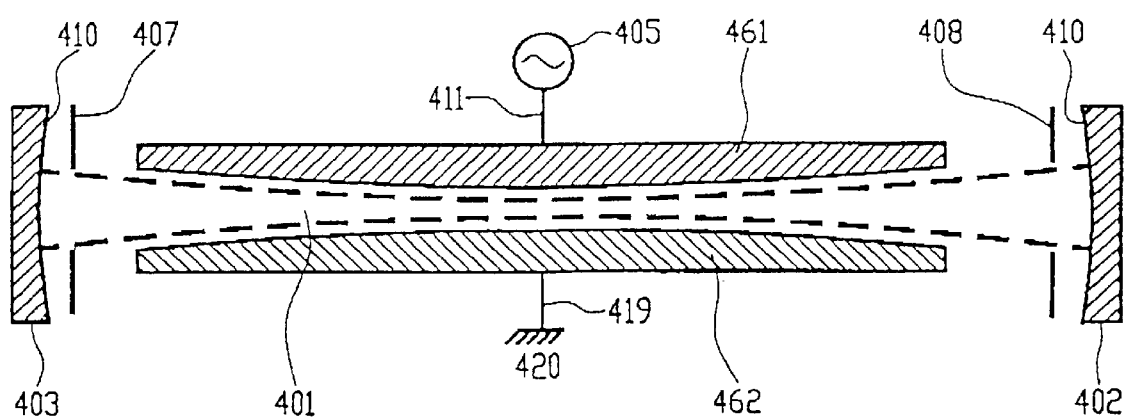
FIG. 4 shows a schematic cross-sectional view of a third embodiment of the present invention.
Figure 5:
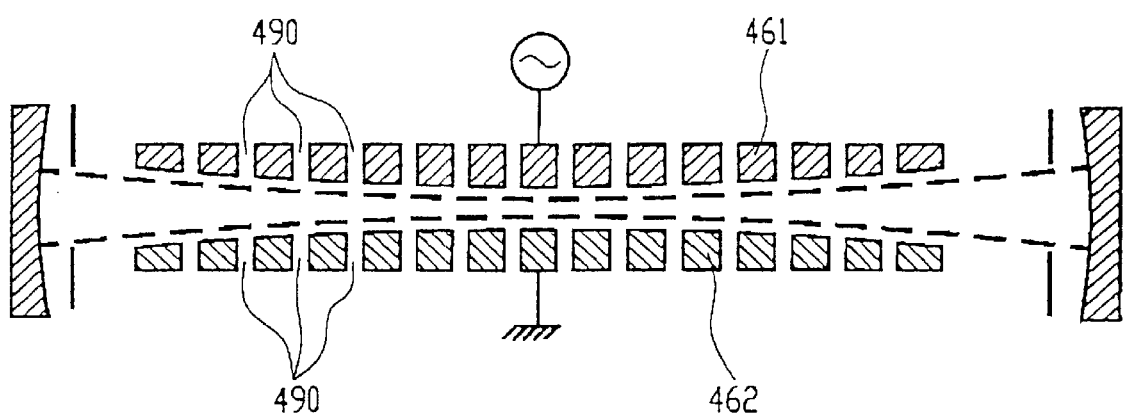
FIG. 5 shows a schematic cross-sectional view of a fourth embodiment of the present invention.

With reference to FIG. 4 and FIG. 5 a third and a closely similar fourth embodiment of the present invention are now described.

FIG. 4 is schematic cross-sectional view where resonator mirrors 402 and 403, respectively, form a negative branch unstable resonator in the plane perpendicular to the drawing plane. The distance between the resonator mirrors 402 and 403 is defined as L. Curvatures 410 of the resonator mirrors 402 and 403, respectively, in a plane perpendicular to the surfaces of cooling elements 461 and 462 are additionally formed such that. in a plane corresponding to the drawing plane of FIG. 4. their radius defined as R. is larger than the distance of the resonator mirrors L thus forming a stable resonator. Aperture means 407 and 408 are placed in front of resonator mirror 403 and 402, respectively. A laser gas 401 is provided between surfaces of the cooling elements 461 and 462, respectively. The cooling elements are made of an electrically and thermally conductive material and. cooling element 461 is connected to RF current source 405 via electrical connector 411, whereas cooling element 462 is connected to reference potential 420 by means of electrical connector 419.

The radius R of the resonator mirrors 403, 402 is selected to R>L in order to form a stable resonator in the drawing plane of FIG. 4. The size of the aperture means 407 and 408 is chosen to restrict the laser beam such that it does not touch the surfaces of the cooling elements. Advantageously, the surfaces of the cooling means are formed so as to substantially be shaped like the beam section variation along the optical axis in the drawing plane of FIG. 4. In this way the cooling efficiency is increased compared to plane cooling surfaces having a constant distance.

FIG. 5 shows a similar arrangement to FIG. 4 with modified cooling elements 561 and 562. The cooling elements 561 and 562 comprise passage ways 590 in order to allow a gas exchange of the laser gas 501 with peripheral cooling means (not shown) in order to further increase the cooling power of the laser device.

Figure 6:
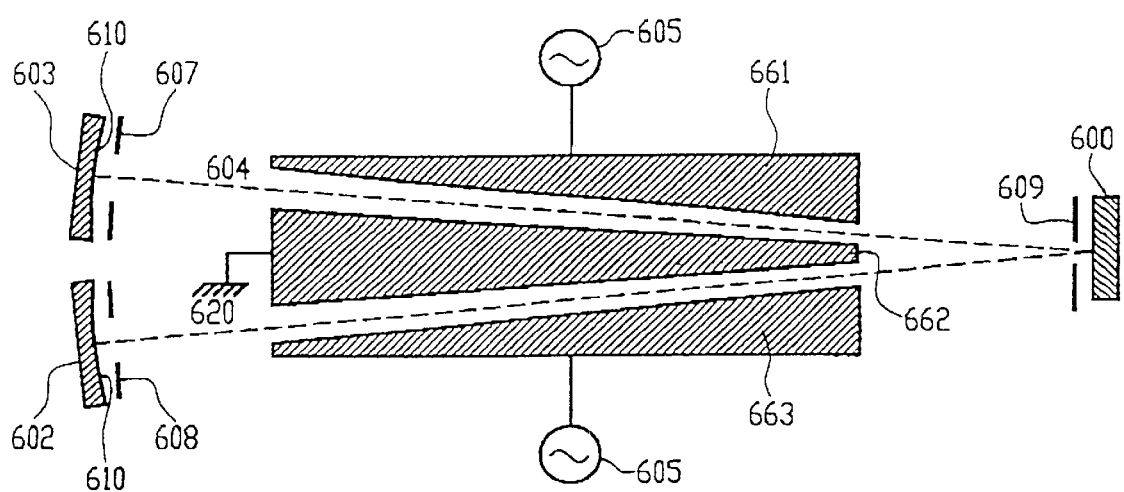
FIG. 6 shows a schematic cross-sectional view of a fifth embodiment of the present invention.

FIG. 6 shows a cross-sectional view of a fifth embodiment of the present invention. wherein the optical axis is divided into two portions.

In FIG. 6 mirror means 600 with a plane reflective surface is provided having further aperture means 609 in front of it and dividing an optical axis 604 into two portions. Resonator mirrors 603 and 602 form an negative branch unstable resonator in the plane perpendicular to the drawing plane of FIG. 6. The resonator mirrors comprise an additional curvature 610 for forming a stable resonator in the drawing plane of FIG. 6 and thus are bicylindrical mirrors. In front of the resonator mirrors 603 and 602, aperture means 607 and 608, respectively are arranged. Cooling elements 661, 662 and 663 are made of an electrically and thermally conductive material forming two laser active volumes. RF current source 605 is connected to cooling elements 661 and 663 via electrical connectors 611 and 617, respectively. Cooling element 662 is connected to a reference potential 620 via electrical connector 619.

Mirror means 600 divides the optical axis 604 into two portions and hence, distance L defining the distance of the resonator mirrors in a corresponding longitudinal arrangement is separated into two parts having the length of L/2, respectively. The resonator mirrors form a negative branch unstable resonator in the plane perpendicular to the drawing plane of FIG. 6, and by means of the additional curvatures 610 and aperture means 607, 608 and 609 a stable resonator in the drawing plane of FIG. 6 is formed confining the radiation in this plane. Mirror means 600 does neither affect the unstable resonator system nor the stable resonator system. The distance of the surfaces of the cooling means may vary in order to be closely adapted to the variable beam section along the optical axis.

A further preferred embodiment of the present invention is now described with reference to FIG. 7 and FIG. 8.

Figure 7:
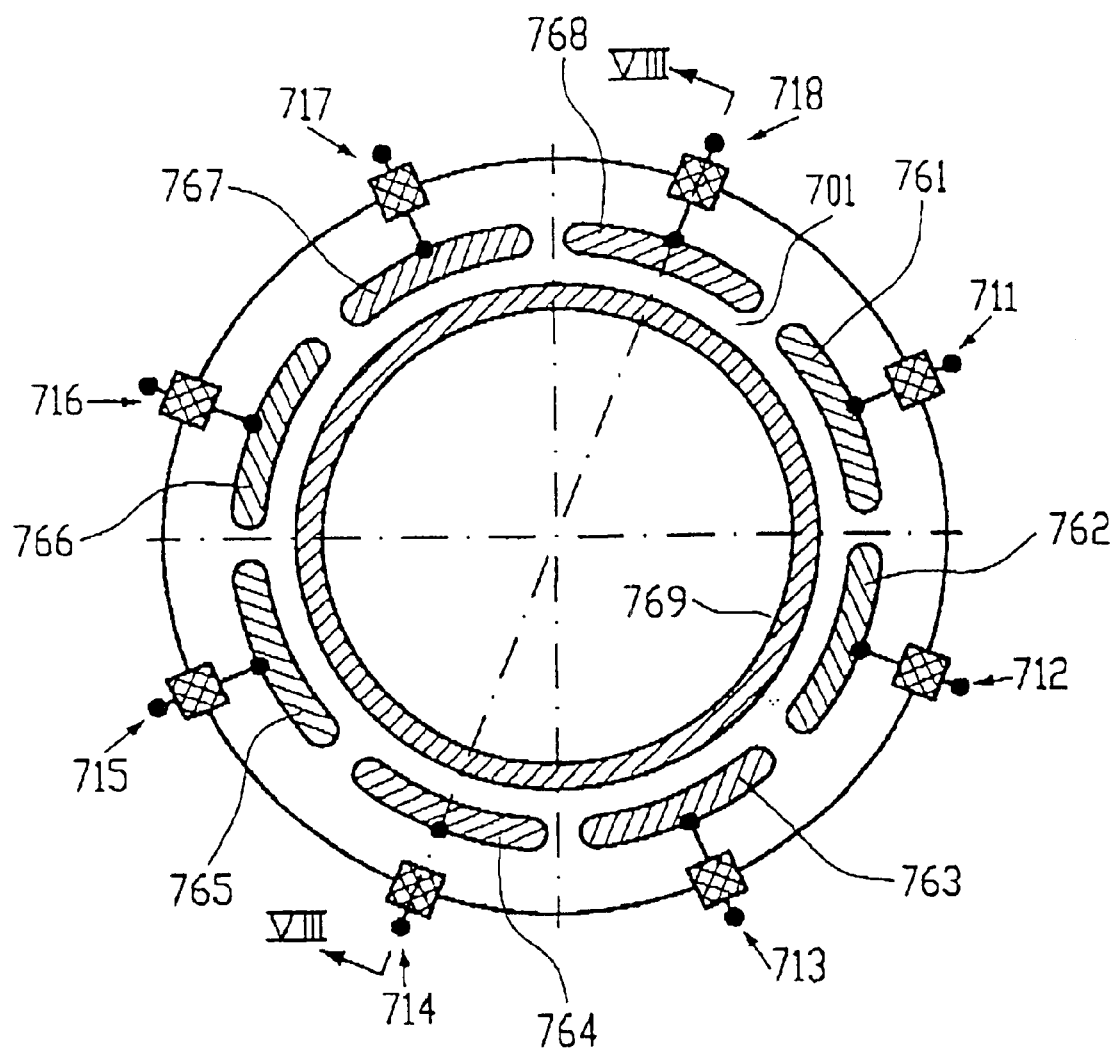
FIG. 7 shows a schematic cross-sectional view of a sixth embodiment of the laser device according to the present invention.

FIG. 7 is a schematic cross-sectional view perpendicular to the optical axis of a sixth embodiment of the laser device according to the present invention.

The laser in FIG. 7 includes cooling means comprising cooling elements 761 to 769 made of an electrically and thermally conductive material, wherein cooling element 769 is a hollow cylinder surrounded by cylinder plates 761 to 768 arranged along a notional cylinder surface so as to form respective gaps between the inner cylinder 769 and the cylinder plates 761 to 768. The cylinder plates are coupled by electrical connectors 711 to 718 to each other and an RF-power source (not shown). The hollow cylinder forming cooling element 769 is electrically connected to a reference potential (not shown). A laser gas 701 is provided in said gaps.

When cooling elements 761 to 769 which also serve as electrodes are supplied with a radio frequency current via electrical connectors 711 to 718, laser gas 701 between the hollow cylinder 769 and the cooling elements 761 to 768 is excited and emits stimulated radiation. The confinement of the radiation field will be discussed with reference to FIG. 8 in the following paragraph.

Figure 8:
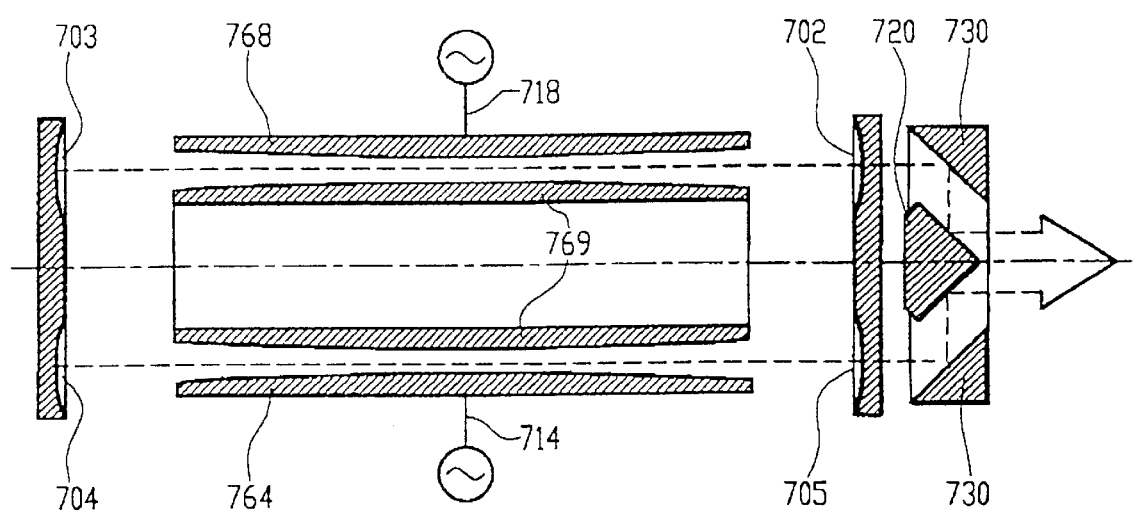
FIG. 8 is a cross sectional view of the sixth embodiment of the present invention in a plane perpendicular to FIG. 7 taken along the line VIII—VIII in FIG. 7.

FIG. 8 is a cross sectional view of the sixth embodiment of the present invention in a plane perpendicular to FIG. 7 and indicated therein by section line VIII—VIII.

In FIG. 8, resonator mirrors 703, 702 and 704, 705, respectively are provided having a curvature of the tone type, i.e. the refractive power of the resonator mirrors in the planes perpendicular to the surface of the cooling elements is different compared to the transverse planes perpendicular thereto, and thus, confinement of the laser beams in both transverse directions within the active volumes formed by the cooling elements 768, 769 and 764, 769, respectively, is achieved. Resonator mirrors 702 and 705 are partially transparent. Furthermore, cooling elements 768, 769 and 764 are shaped so as to substantially coincide with the sections of the laser beams along their propagation path. The laser beams are output at the partially transparent mirrors 702 and 705, respectively. The output laser beams are directed towards an axicon 720 by a conic mirror 730.

Figure 9:
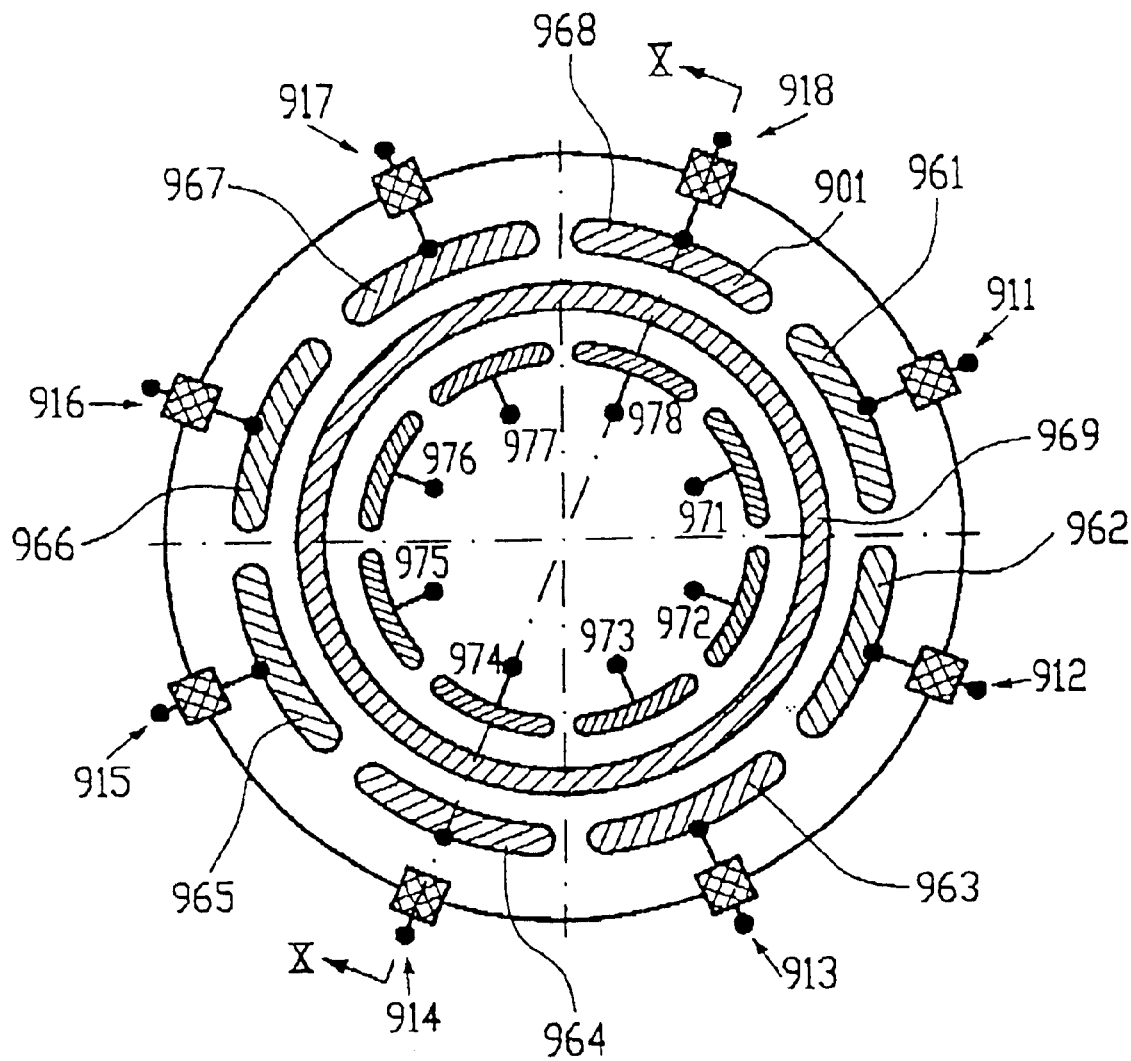
FIG. 9 shows a schematic cross-sectional view of a further embodiment of the laser device according to the present invention.

FIG. 9 shows a cross section of an embodiment according to the present invention similar to the one as explained with reference to FIGS. 7 and 8. Compared to the embodiment as illustrated in FIG. 7 additional cooling elements 971 to 978 form a ring of cylinder segments. In FIG. 9, elements which are identical or similar to corresponding elements of FIG. 7, are identified by corresponding reference numerals, except for a 9 instead of a 7 as the leading digit thereof.

Figure 10:
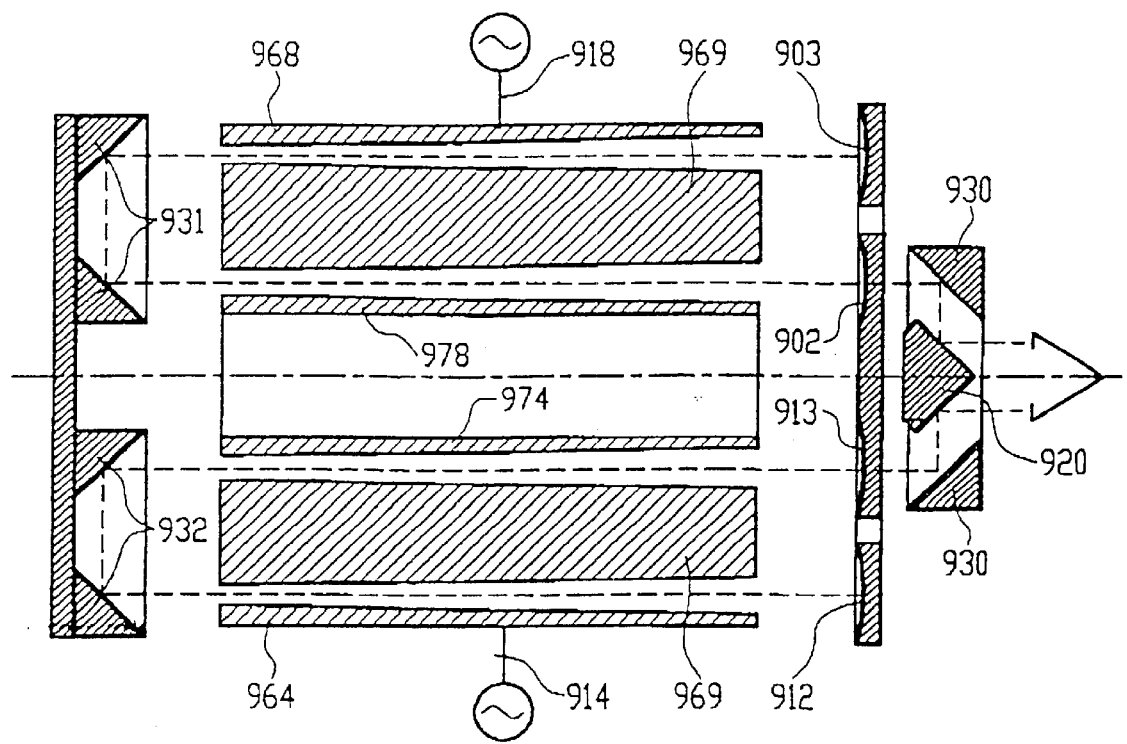
FIG. 10 is a cross sectional view of the sixth embodiment of the present invention in a plane perpendicular to FIG. 9 taken along the line X—X in FIG. 9.

FIG. 10 shows a section along the line X—X of FIG. 9. In the upper portion of FIG. 10 an optical cavity is formed by resonator mirrors 903, 902 which are of the tone type. and a conic mirror 931. In the lower portion of FIG. 10 an optical cavity is formed by resonator mirrors 913, 912 which are of the toric type, and a conic mirror 932. The laser beams output at the partially transparent resonator mirrors 902 and 913, respectively are reflected towards an axicon 920 by a conic mirror 930. Cooling elements 968, 969 and 978, 969 are shaped so as to substantially coincide with the section of the laser beam along the propagation path within the resonator mirrors 903 and 902. The same applies to the cooling elements 974, 969 and 974, 969 shown in the of the lower portion of FIG. 10. For a better illustration the thickness of cooling element 969 is arbitrarily scaled and does not coincide with the scaling of FIG. 9.

For high output power laser devices as described with reference to FIGS. 7, 8, 9 and 10, the cylindrical geometry was selected in order to simplify manufacturing the devices. It is to be noted in this respect that it is a considerable advantage of the present invention that the surfaces of the cooling elements contacting the laser active medium are not restricted to even planes. However, a different geometry is possible, e.g., multicorner arrangement, such as quadratic, hexagonal, etc.

In all above mentioned figures describing the embodiments of the present invention dealing with gas lasers excited by an RF current source, the compensation inductivities required for a uniform distribution of the electric field in the cooling elements serving as electrodes, are omitted. Preferably, if the distance of the cooling elements varies in the direction of the optical axis, the inductivities are to be property adapted to achieve a constant RF power input along the cooling elements.

The features of the present invention which is described above with reference to the preferred embodiments can be summarised as follows:

In a laser device an increased cooling area is provided by cooling surfaces which are not necessarily restricted to a plane geometry, and a laser gas is confined in the transverse direction (respectively directions, when the surfaces are not even) by these cooling surfaces. The cooling elements providing the cooling surfaces may be made of an electrically conductive material in order to simultaneously serve as electrodes for applying an RF current to the laser active medium. In the other transverse direction(s) having a larger dimension the radiation field is confined by spherical resonator mirrors forming an optical resonator system, preferably a negative branch unstable type. In the transverse direction(s) restricted by the cooling means the operation of the resonator system has to be "assisted" by an additional optical element in order to avoid zigzagging of the laser beam and/or touching of the cooling surfaces, or decreasing the distance of the cooling surfaces for operating the laser in a lowest order mode resulting in a reduced active volume and a necessity of high quality surfaces. According to the unstable resonator used in the described embodiments this additional optical element collimates the radiation in the direction(s) perpendicular to the cooling surfaces and thus, forms in conjunction with the resonator mirrors a resonator system which completely avoids contact of the lowest order mode of the confined radiation with the cooling surfaces, and thus allowing the generation of a lowest transverse order laser beam. The procedure of selecting a lowest order mode radiation may be supported by aperture means.

However, the realisation of the present invention is not restricted to gas lasers. For instance, an appropriately shaped YAG-crystal may be used as laser active medium. Moreover, the excitation of the laser active medium can be carried out by optical pumping or an external laser beam.

What is claimed is:

1. A laser device, comprising:

a laser active medium;

an optical resonator system defining an optical axis;

exciting means for exciting said laser active medium and enabling a stimulated emission of radiation of said laser active medium; and cooling means, having first and second cooling elements arranged in spaced opposing relationship with surfaces facing each other, wherein said laser active medium is provided between said cooling elements along said optical axis, characterised in that an optical element is provided, arranged in the optical path formed by said optical resonator system and having a refractive power in a first plane along the optical axis and perpendicular to said surfaces, differing from a refractive power in a second plane along the optical axis and perpendicular to said first plane, wherein said refractive power in said first plane of said optical element is adjusted so as to prevent interaction of the lowest transverse laser mode with the surfaces of said first and second cooling elements.

2. A laser device according to claim 1, further comprising aperture means for reducing an optically effective distance between said first and second cooling elements.

3. A laser device according to claim 1, wherein said optical element forms in combination with said optical resonator system a stable resonator in the planes along the optical axis and perpendicular to said surfaces of said cooling elements.

4. A laser device according to claim 1, wherein a distance of said surfaces is variable along the optical axis in dependence of a variation of the beam section.

5. A laser device according to claim 4, wherein said distance variation along the optical axis substantially resembles the shape of the beam generated by said resonator system and said optical element.

6. A laser device according to claim 1, further comprising a mirror means for reflecting said radiation, thereby dividing said optical axis into a first and at least one further portion forming an angle.

7. A laser device according to claim 6, wherein said optical element has a reflective surface for forming said mirror means.

8. A laser device according to claim 7, wherein said optical element is a cylindrical mirror.

9. A laser device according to claim 6, wherein said portions of the optical axis are not in a common plane.

10. A laser device according to claim 9, wherein said cooling means comprises an inner tubular cooling element and at least one outer cooling element arranged so as to form a gap for containing the laser active medium therein, and at least one of said portions of said optical axis being parallel to the axis of said tubular inner cooling element.

11. A laser device according to claim 9, wherein said mirror means comprises reflecting surfaces for optically combining laser beams respectively propagating along said portions of the optical axis.

12. A laser device according to claim 11; wherein said reflecting surfaces form a conic mirror and an axicon.

13. A laser device according to claim 1, wherein said optical resonator system comprises two mirror means, and wherein said optical element is integrated into one of said mirror means.

14. A laser device according to claim 1, wherein said first and second cooling elements of said cooling means are made of an electrically conductive material.

15. A laser device according to claim 1, wherein said exciting means is a radio frequency source including a power matching circuitry, and said radio frequency source is electrically connected to said first and second cooling elements of said cooling means.

16. A laser device according to claim 1, wherein said laser activemedium is a laser gas.

17. A laser device according to claim 16, wherein said gas comprises the components: $CO_2$, $N_2$, He, Xe.

18. A laser device according to claim 16, wherein said cooling elements comprise passage ways for allowing a gas flow.

19. A laser device according to claim 1, wherein said optical resonator system is a negative branch unstable resonator system.

20. A laser device according to claim 1, wherein said distance between said surfaces of said cooling elements is in the range between 2 and 15 mm.

21. A laser device according to claim 1, wherein said surfaces are even planes.

* * * * *

UNITED STATES PATENT AND TRADEMARK OFFICE
CERTIFICATE OF CORRECTION

PATENT NO. : 6,442,187 B1
DATED : August 27, 2002
INVENTOR(S) : A.I. Dutov et al.

It is certified that error appears in the above-identified patent and that said Letters Patent is hereby corrected as shown below:

Column 12,
Line 20, "claim 11;" should be -- claim 11, --.
Line 35, "activemedium" should be -- active medium --.

Signed and Sealed this

Third Day of June, 2003

JAMES E. ROGAN
*Director of the United States Patent and Trademark Office*